Patented Nov. 21, 1950

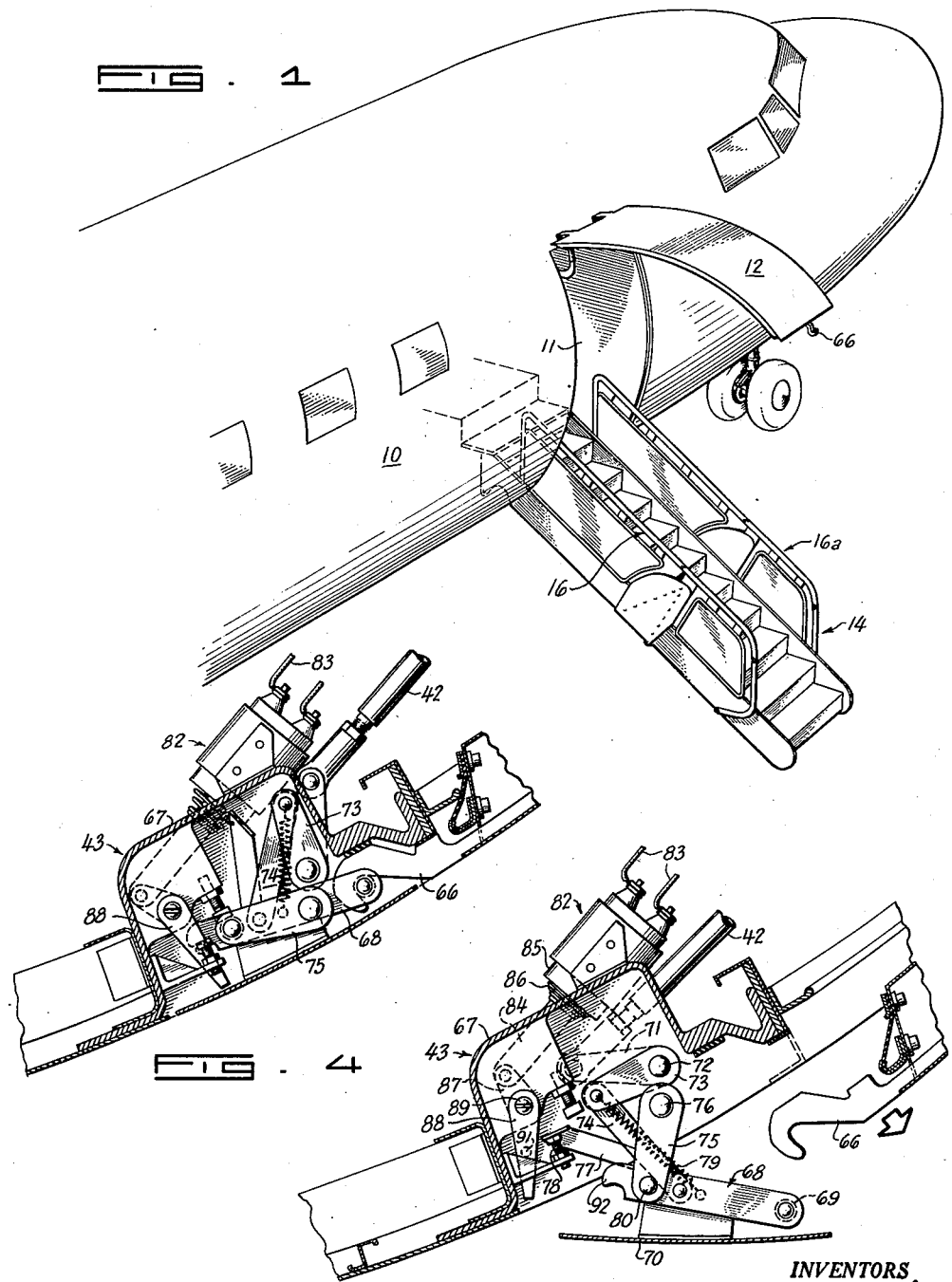

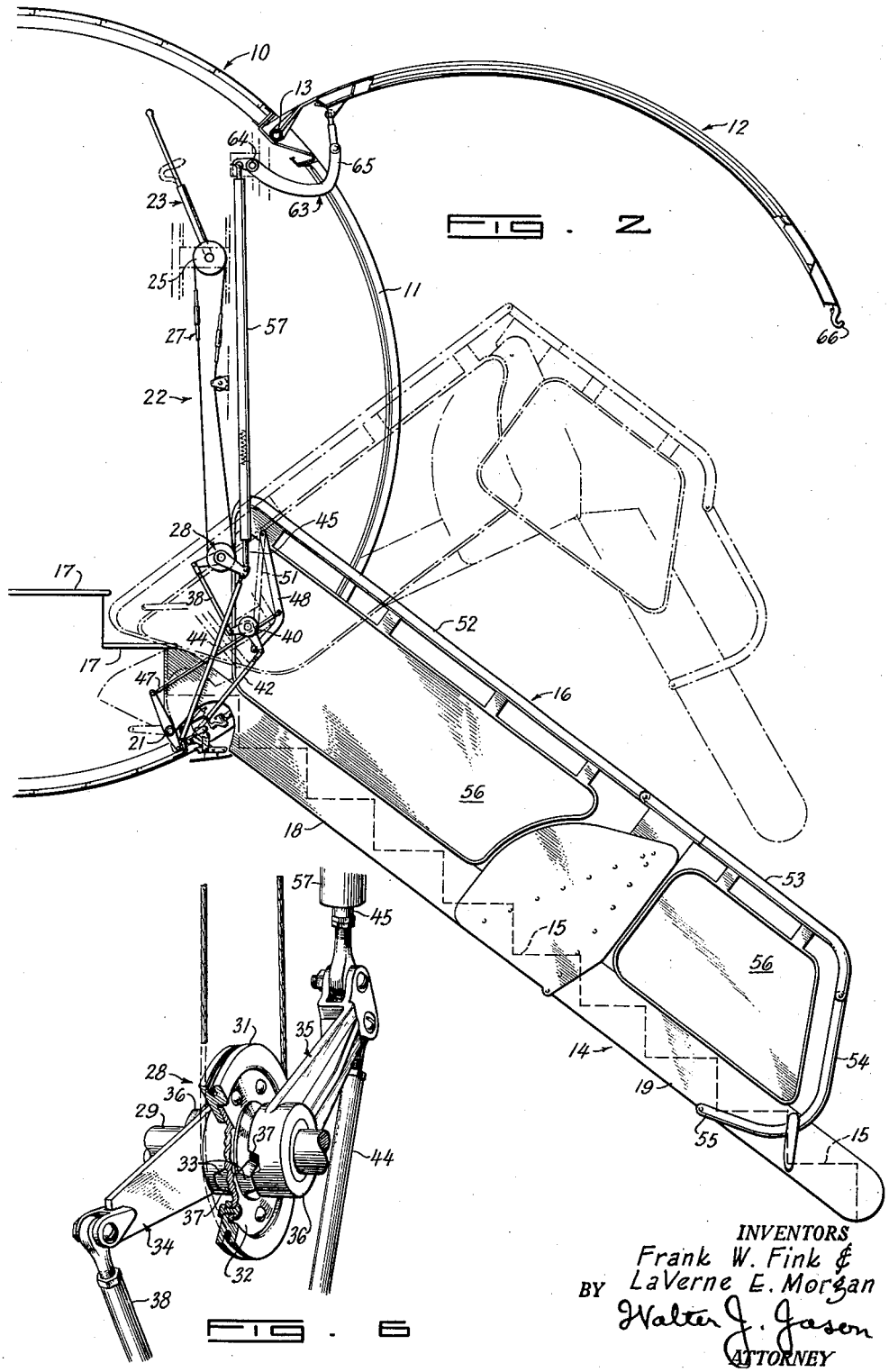

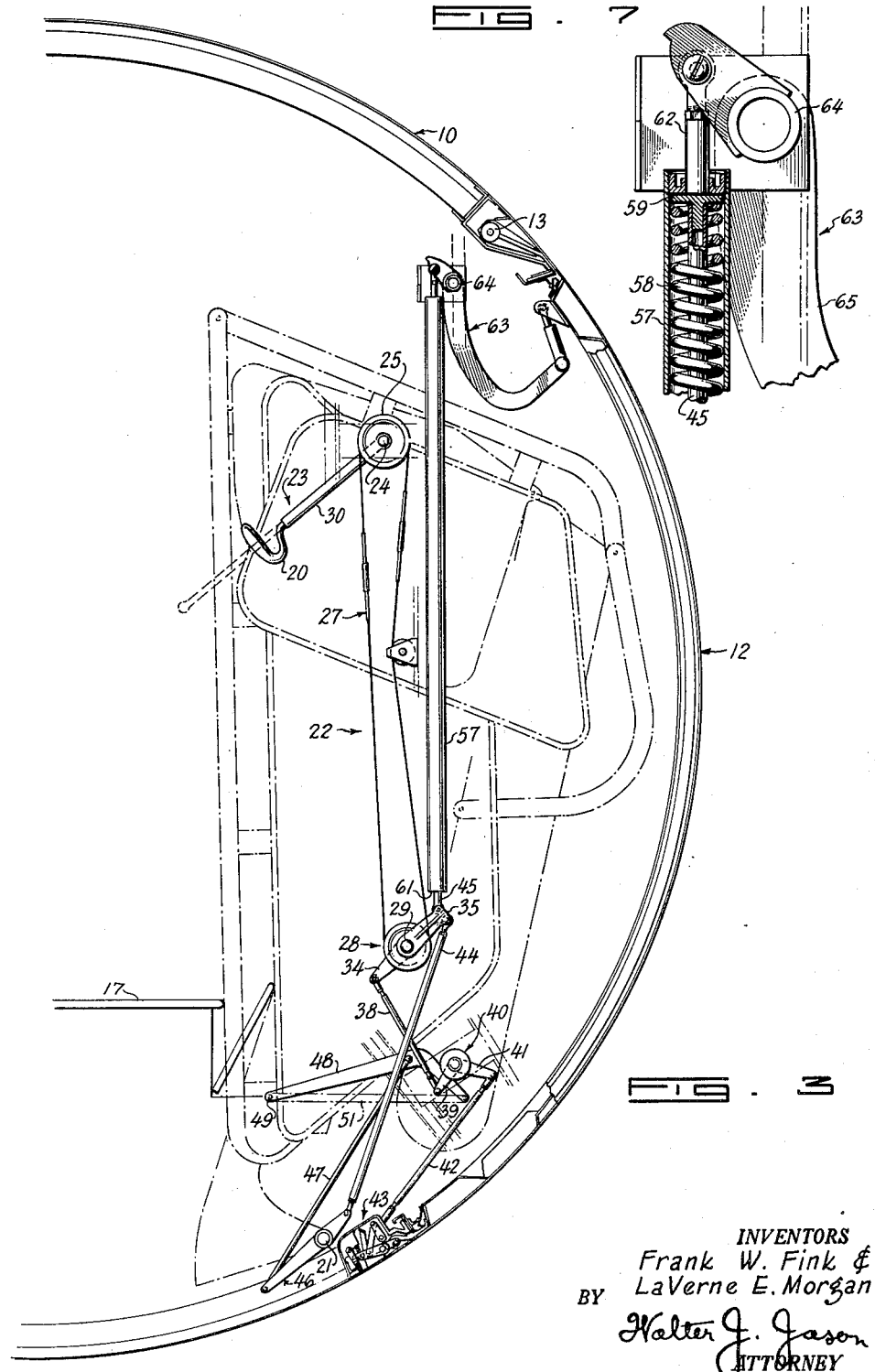

2,531,263

UNITED STATES PATENT OFFICE 2,531,263

COACTING DOOR AND MOVABLE STAIRWAY COMBINATION

Frank W. Fink and La Verne E. Morgan, San Diego, Calif., assignors to Consolidated Vultee Aircraft Corporation, San Diego, Calif., a corporation of Delaware Application February 20, 1947, Serial No. 729,718

17 Claims. (Cl. 244—129)

1

The present invention relates to aircraft and more particularly to improved means whereby access to and egress from the interior of an airplane may be had.

It is an object of this invention to provide a novel door and stairway combination which is affixed to the aircraft and carried thereby and which is available for immediate use upon landing of the aircraft to facilitate access or egress from the aircraft.

Another object of this invention is to provide in an aircraft an improved door and retractable stairway combination adapted to be operated conjointly between loading and unloading positions.

Another object of the invention resides in providing in an aircraft a co-acting door and retractable stairway having associated therewith improved operating means whereby they may be readily manually actuated between their operative and inoperative positions.

Still another object of this invention lies in the provision of a novel co-acting door and retractible stairway combination utilizing an improved remotely operated safety latching means to prevent inadvertent operation of the combination.

A further object of the invention is the provision of a novel co-acting door and retractable stairway combination wherein the retractable stairway is readily foldable in such a manner as to occupy a relatively small space within the aircraft within which it is adapted to be stowed.

Other objects and features of the invention will be readily apparent to those skilled in the art from the following specification and appended drawings illustrating certain preferred embodiments of the invention in which:

Figure 1 is a fragmental perspective view of a fuselage of an airplane illustrating the door open and the stairway in loading position;

Figure 2 is a fragmentary sectional view likewise showing the door open and the stairway in loading position;

Figure 3 is an enlarged fragmentary sectional view showing the door in its closed position and the stairway retracted within the airplane and in its stowed position;

Figure 4 is a fragmentary sectional detail view illustrating the latching mechanism in locked position together with the safety latching means;

Figure 5 is a view similar to Figure 4 but showing the latching mechanism in open position;

Figure 6 is an enlarged fragmentary view illustrating a detail of the operating mechanism; and Figure 7 is an enlarged fragmentary view illustrating a detail of the door operating mechanism.

Having reference to the drawings and more particularly to Figures 1 and 2 there is shown an airplane fuselage 10, of conventional design, having a doorway or door opening 11 provided in the side thereof to permit access to the interior of the airplane at a point at the forward end of the passenger compartment. A door 12 is provided for closure of the doorway 11. The door 12 is pivotally mounted by suitable hinge means 13, provided at its upper edge, to the fuselage 10 and is adapted to be swung outwardly to open position. As best seen in Figure 3, the door 12 is so shaped that, when it occupies its closed position, it conforms to the contour of fuselage 10, and forms a part of the enclosing wall thereof. By providing a door 12 having this conforming contour the streamline construction of the fuselage will be maintained and no resistance will be afforded to the air stream and consequently the door 12 will not be a source of drag.

Leading to the doorway 11, to permit persons to ascent from the ground and enter the airplane, is a stairway 14. The stairway 14 comprises a plurality of usual steps 15 and a pair of handrail assemblies 16 and 16a which are located on either side of the steps 15. Steps 17 are provided within the fuselage and effect a continuation of stairway 14. The stairway 14, as is apparent from the drawings, is formed into two principal sections, 18 and 19, with lower section 19 which rests upon the ground being suitably hinged to section 18 and foldable thereagainst when the stairway 14 is moved to stowed position within the fuselage 10. The upper section 18 is hinged from its upper end by a shaft 21 to the fuselage; the shaft 21 is suitably mounted on the fuselage structure for rotative movement and the stairway section 18 is rigidly attached to the shaft 21 so that it will rotate therewith. The stairway 14 being hinged to the fuselage 10 and being adapted to be stowed within the fuselage thus forms a part of the permanent equipment of the airplane and it is obvious that an appreciable amount of time is saved because of this, for as soon as the airplane has rolled to a stop the stairway 14 may be lowered and the passengers may descend at once; there is no need to wait for ground personnel to move a detached stairway into position at the doorway. The particular construction of the foldable stairway 14 and the method of hinging the sections thereof to one another and to the fuselage structure are understood to form no part of the present invention for any construction which adapts the stairway to be readily stowable within the fuselage can be used.

The door 12 and the stairway 14 are adapted to move between their extreme positions concurrently—that is if the door is closed and the stairway is folded and in stowed condition the door will move to open position as the stairway unfolds and moves to a position adjacent the ground. In the reverse operation, as the stairway is folding and moving to stowed position the door 12 will move to its closed position. The mechanism for accomplishing this simultaneous movement of the door 12 and the stairway 14 is indicated generally at 22.

As shown in the drawings, and particularly Figures 2, 3, 6, and 7, the operating mechanism 22 for effecting concurrent movement of the door 12 and the stairway 14 comprises a manually operable handle element 23 which is pivotally mounted at one end as shown at 24, to a fixed structural member provided by the fuselage. A pulley or sheave 25 supported on the same pivot 24 as the handle element 23 is adapted to be rotated by the handle 23 upon pivotal movement thereof.

The handle 23 comprises two tubular sections, 20 and 30, with section 20, which has a gripping portion formed thereon, being adapted to telescope into section 30. When handle 23 is to be used to operate the door 12 and stairway 14, section 20 is first drawn out of section 30 to its extended position as shown in Figure 2 and the desired operation performed. On completion of the operation, section 20 is returned into telescoped position within tubular section 30 to move it out of the way so that it cannot be brushed against.

The pulley 25 is connected by a suitable cable system 27 to an actuating pulley 28 which is mounted for rotative movement upon a fixed shaft 29, which shaft 29 is supported by the fixed structure of the airplane. Pulley 25 when moved by handle 23 will through this cable system 27 effect rotative movement of pulley 28 upon shaft 29. The actuating pulley 28 is of a particular construction to permit its operating a plurality of elements to effect the actuation of the door and stairway. The construction of pulley 28 is best illustrated in Figure 6. As shown pulley 28 comprises a grooved wheel 31 to the central portion of which is riveted a circular plate 32. Upon the circular plate 32 are formed a pair of oppositely extending lugs 33.

Supported for rotative movement upon fixed shaft 29 and disposed on either side of actuating pulley 28 are a pair of operating lever members 34 and 35 which are held in spaced relation to one another and against sliding movement on shaft 29 by appropriate means (not shown). Each of the levers 34 and 35 are provided with hub portions 36 having vertical faces disposed adjacent the circular plate 32 afforded by the pulley 28 and in which faces are formed grooves or recesses 37 which are adapted to receive the lugs 33 whereby rotative movement of the pulley 28 by cable system 27 will effect rotative movement of the levers upon shaft 29 in a manner and for a purpose to be more fully described hereinafter. It is to be noted that the pulley 28 is free to slidably move along the surface of shaft 29 between the levers 34 and 35 to carry the lugs 33 into and out of recesses 37.

The lever 34 at its outer end is pivotally connected to an end of a link member 38. The link member 38 is in turn pivotally connected to an arm 39 of a bell crank lever 40 which is pivotally supported upon the fuselage framework. The other arm 41 of bell crank 40 is pivotally connected to one end of a link member 42 whose opposite end is operatively connected to and is adapted to effect the actuation of a latch assembly 43 to be hereinafter described.

The second operating lever 35 disposed on shaft 29 is pivotally connected at its outer end to the ends of two oppositely directed rod members 44 and 45. Rod 44 which extends downwardly from its connection with lever 35 is, at its opposite end, pivotally connected to an arm of an actuating lever 46 which is rigidly affixed on shaft 21, which hinges the stairway 14 to the airplane. Movement of actuating lever 46 by rod 44 will rotate shaft 21 upon its mountings, not shown, to thereby effect rotative movement of the stairway 14 which is rigidly secured to shaft 21 for movement therewith. The actuating lever 46 is also adapted to effect movement of the handrails 16 and 16a relative to the stairway. To provide such movement there is pivotally joined to the lever 46 a rod member 47. This rod member 47 interconnects lever 46 with a generally L-shaped lever 48 which latter lever is pivotally connected at one end, as at 49, to the handrail 16 and has its other end pivotally affixed to the fuselage structure. Generally L-shaped lever 48 by virtue of this connection at 49 to the handrail 16 provides a support for one end of the handrail and maintains the handrail properly positioned with respect to the stairway 14. A lever 51, shown in dotted outline in Figures 2 and 3, having its lower end pivotally mounted on the fuselage structure and its upper end pivotally connected to the end of the opposite handrail 16a supports this latter handrail in proper position relative to stairway 14. Thus, the support for the upper ends of the handrails 16 and 16a are provided by the generally L-shaped lever 48 and the lever 51. The handrails 16 and 16a are, as shown, sectionalized and comprise three principal tubular sections 52, 53, and 54 with the central section 53 being hinged to the handrail sections 52 and 54 disposed on either side of it and with section 54 being hingedly connected at 55 to stairway 14 near the ground contacting end thereof. A plurality of side panels 56, as is shown in the drawings, depend from the tubular sections described and are movable therewith. By reason of this hinged construction of the handrails 16 and 16a the various sections thereof will move relative to the stairway 14 as it moves to folded and to stowed position as illustrated by the dotted line representations in Figures 2 and 3. This shifting of position of the handrails 16 and 16a relative to stairway 14 will permit stowing of the stairway and the handrails it carries in a lesser space in the fuselage 10. The handrails 16 and 16a by reason of their construction also assist the stairway 14 in assuming its folded and its straightened position as will be hereinafter fully described.

Rod 45 pivotally connected at one end to operating lever 35 extends upwardly therefrom and lies disposed for the major portion of its length within tubular member 57 and is movable therein. As best shown in Figure 7, a spring 58 contained within tubular member 57 is disposed about rod 45. The spring 58 is located between a spring seat 59 carried by the rod 45 at its upper end and a lower spring seat provided by a flange, not shown, formed at the lower end 61 of tubular member 57. With this construction movement of rod 45 downwardly and outwardly from the housing provided by tubular member 57 will effect a compression of spring 58. The operation and function of this spring within the operating system of the stairway will be more fully brought out hereinafter.

To the upper end of tubular member 57 is rigidly secured a link element 62 which serves to interconnect the tubular member 57 and a door actuating lever 63. The door actuating lever 63 is pivotally connected as at 64 to the fuselage structure and comprises a generally arcuately shaped arm portion 65 the outer end of which is pivotally attached to the door 12 near the upper end thereof as shown. The door actuating lever 63 is operable upon movement of the tubular member 57 by rod 45 to move the door 12 to its open and closed positions.

At the outer end of door 12 is affixed a hook element 66 which is engageable by the latch assembly 43 to securely lock the door when it has been moved to closed position.

The latch assembly 43 is located at a point below the doorway 11 and is contained within a housing 67 which opens to the exterior of the airplane. Latch assembly 43 comprises a movable latching lever 68 carrying a pin 69 at one end which is engageable with the hook 66. A plate 70 is carried by latching lever 68, which closes the opening to housing 67 when the latching lever is in engaged position. To move the latching lever 68 there is provided a rotatable link 71 connected to the end of the manually operable link member 42. Link 71 is adapted to rotate a pin 72 carried by housing 67 which carries a link member 73 which is connected to latching lever 68 by a pivotally attached link member 74. A link member 75 rotatable about a fixed pivot 76 also is pivotally connected, at 80, to latching lever 68. Carried by the link member 75 is an arm 77 which is engageable with a stop 78 to determine the limit of rotative movement of link member 75. A spring 79 interconnects the junction point of link members 73 and 74 and the latching lever 68. The operation of the various elements comprising the latching assembly 43 will be hereinafter described.

Safety mechanism to prevent the inadvertent operation of the latching lever 68 is provided. This mechanism comprises a usual solenoid 82 which is connected by electrical leads 83 to the pilot's compartment whereby the pilot may, from this remote position, effect energization of the solenoid 82. The solenoid 82 embodies a longitudinally movable plunger 84 which operates, in conventional manner to move inwardly into the solenoid casing 85, on energization of the solenoid 82. A spring 86 connected to plunger 84 biases this member for movement outwardly from the casing 85 upon de-energization of the solenoid. A pivoted lever 87 is actuable upon movement of plunger 84 to rotate a second lever 88 which utilizes the same pivot, 89, as lever 87. This second lever 88 is provided with a pin 91 adapted to be engaged by notched portion 92 of latching lever 68. So long as pin 91 is in engagement with this notched portion 92 the latching lever 68 may not be moved to release hook 67 carried by door 12 and the door 12 will remain locked. At such time as the pilot desires that the door 12 be opened he will, by actuation of suitable switch means, not shown, effect the energization of solenoid 82 to move plunger 84 inwardly whereby lever 88 is rotated clockwise about its pivot 89 to move pin 91 out of engagement with notched portion 92 whereby the person tending the door may then manually operate the latching assembly and open the door. It is understood that the structural details of the latching assembly 43 and the safety mechanism associated therewith are not a part of this invention and it is contemplated that any devices operable to perform the same function can be utilized. Thus, since the door 12 cannot be operated until the pilot first acts there is no possibility of the door being inadvertently opened before the airplane is in proper position.

The manner of operating the door 12 and stairway 14 between their closed and open position will now be described.

Assuming the door 12 locked in closed position and stairway 14 folded and in stowed position within the fuselage 10 as in Figure 3 and the airplane positioned at a point where passengers are to be unloaded the pilot will actuate the switch in the pilot's compartment which controls the solenoid 82 to effect energization thereof. Energization of solenoid 82 will effect a retraction of plunger 84 into the solenoid casing 85 to rotate lever 88 clockwise to carry pin 91 out of engagement with the notched portion of latching lever 68. With pin 91 moved to release the latching mechanism the stewardess pulls the hand grip portion of handle element 23 toward her and then rotates the handle in a clockwise direction. This rotative movement of handle 23 will actuate cable system 27 to rotate pulley 25 to effect clockwise rotation of actuating pulley 28 on shaft 29. Pulley 28, when door 12 is in closed position, is connected with lever 34, lug 33 resting within recess 37 in hub 36 thereof providing the connection. Since pulley 28 is connected to lever 34 the rotative movement thereof by pulley 25 will first rotate lever 34 in like direction. This rotation of lever 34 will effect a clockwise rotation of bell crank lever 40 by reason of the connection therewith provided by link member 38. Bell crank 40, in rotating, will move link member 42 toward the latch assembly 43. Link member 42 moving toward latch assembly 43 will rotate link members 71 and 73 counter-clockwise to move connecting link 74. This movement of link members 71 and 73 and connecting link 74 will first cause latching lever 68 to pivot, in a counter-clockwise direction, about its engagement with hook 66. Link member 75 connected to latching lever 68 will be forced to rotate in the same direction, carrying arm 77 toward engagement with stop 78. Spring 79 exerts its bias to hold latching lever 68 in engagement with hook 66 to permit proper pivotal movement of lever 68. Latching lever 68 continues to pivot in this direction until arm 77 engages stop 78, at which time continued application of force to the latching lever 68 by connecting link 74 will cause latching lever 68 to rotate about a new pivot point, 80, against the bias of spring 79, and in a clockwise direction to carry pin 69 out of engagement with hook 66, thus freeing the door 12.

This release of hook 66 is accomplished during the first movement of the handle element 23, in a clockwise direction, by the stewardess. Continued clockwise movement of the handle 23 will continue to rotate actuating pulley 28, but lever 34 being held against further rotation by reason of link member 38, the lug 33 engaging lever 34 will cam out of recess 37 provided in hub 36 thereof and in the process of camming out of engagement the pulley 28 slides along fixed shaft 29 and toward lever 35 whereby the oppositely disposed lug 33 will slip into recess 37 in hub 36 of lever 35 to effect a connection between the pulley 28 and the lever 35. With the pulley 28 and lever 35 thus engaged, further rotative movement of the former by the operation of handle 23 will rotate lever 35 clockwise to actuate rod member 45 to compress spring 58 and move tubular member 57 and thereby apply a pull on the door operating lever 63 to rotate it about its pivot 64 to swing the door 12 outwardly about hinge 13. The compression spring 58 disposed within tubular member 57 is preloaded so that but a slight pressure on the handle 23 is required to bring about the outward swinging of door 12 and in a rapid manner. With the construction described it is assured that the door 12 will move quickly and will not in any way interfere with the movement of the stairway.

As has been described the clockwise rotation of lever 35 by pulley 28 moves rod member 45 to effect movement of door 12 to open position, in addition lever 35 actuates rod member 44 which connects with the actuating lever 46 to rotate it clockwise. Lever 46, as has been stated, is fixed upon shaft 21 to which stairway 14 is also fixed. Clockwise rotation of actuating lever 46 will then rotate shaft 21 and thereby rotate the stairway 14 for movement through open doorway 11. In its movement through doorway 11 stairway 14 begins to unfold with section 19 thereof falling away from section 18 and to extended position by reason of gravity and under force applied to section 19 by the various handrail sections. Lever 46 in addition to actuating stairway 14 outwardly likewise, through the agency of the rod member 47 and the generally L-shaped member 48, applies a force to the handrail section 52 to which the latter member is pivotally connected to move it relative to stairway 14. This force will be transmitted through handrail section 52 to the other handrail sections 53 and 54 and section 54 will, as the stairway 14 approaches the ground, move to its proper position relative to the stairway and will snap the lower section 19 into the desired fully extended position. As the stairway 14 falls outwardly and into extended position its weight will act through actuating lever 46 and connecting rod member 44 to move rod member 45 relative to tubular member 57 to compress spring 58 in tube 57. This will have the result of effecting a state of substantial equilibrium wherein the force of the compressed spring 58 acting in concert with the upwardly directed force on tubular member 57 provided by the weight of door 12 substantially balances the weight of the stairway, so that the travel downwardly of the stairway will be slowed thereby, preventing the stairway striking the ground sharply with possible shock damage thereto. This compression of spring 58 will also be useful at such time as the stairway 14 is to be retracted and will assist in overcoming the inertia thereof. The spring 58 in effect serves as a counterbalancing means.

The operation above described of swinging the door 12 to open position and of unfolding and moving the stairway 14 to extended position and in contact with the ground is, by virtue of the present invention, one which is readily and efficiently accomplished and with a minimum of muscular effort being required by the operator.

The reverse operation of moving the stairway 14 into folded condition and into the fuselage 10 and of closing the door 12 is one that is as readily and as easily accomplished.

The handle 23 will be rotated counter-clockwise, from the position of Figure 2 to provide counter-clockwise movement of pulley 28 and of lever 35 tied thereto by lug 33. Lever 35 will actuate lever 46 with which it is connected by rod member 44 to rotate shaft 21 to which stairway 14 is affixed. Spring 58 which was under additional compression due to the weight of stairway 14 will exert its bias to assist in the rotation of shaft 21 and therefore but little work or effort will be required to operate handle 23 to cause the stairway 14 to move upwardly and retract into the fuselage 10. Rotation of lever 46 will through connecting links 47 and 48 start the movement of the hinged handrail sections 52, 53, and 54 relative to each other and the stairway 14. The lowermost section 54 will apply a force to the lower stairway section 19 which will fold this stairway section against the upper stairway section 18. As the stairway 14 moves to folded position within the fuselage 10 the continued movement of lever 35 will through rod 45, tubular member 57 and the contained compressed spring 58, bring about rotative movement of the door 12 to swing it inwardly to its closed position. With the stairway 14 disposed within the airplane a continued rotation of the pulley 28, counter-clockwise, will cause it to separate from lever 35, connecting lug 33 camming out of engagement therewith when connecting rod 44 has reached the limit of its travel and thus stops further rotation of lever 35. As pulley 28 cams out of engagement with lever 35 it slides along the surface of shaft 29 to bring the opposite lug into engagement with lever 34 so that this latter lever can then be rotated by lever 35. Lever 34 will through the connecting link member 38, bell crank lever 40 and connecting link member 42 operate the latching lever 68 through the linkage system, hereinbefore described at length, interconnecting these two members. In this operation latching lever 48 will, as is readily discerned, be moved to bring the notched portion 92 thereof into engagement with pin 91 carried by lever 88 and to bring pin 69 into engagement with hook 66 to thereby securely lock the door 12 in closed position.

The herein described co-acting door and foldable stairway combination and the operating mechanism therefor is basically simple in design and effectively and efficiently performs in the intended manner. The working parts of the combination of the present invention are readily contrallable and with a minimum of applied muscular effort the stewardess or other operator can move the door and stairway between the desired positions; whereby access to and egress from the interior of the cabin is more conveniently made.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. In a vehicle, a body portion having a door opening therein, a door for closing said door opening, latching means for securing said door when in closed position, a stairway movably secured to said body portion leading to said door opening whereby access is had to the interior of said body portion, actuating means for retracting and extending said stairway in and out of said door opening, counterbalancing means operative on said stairway actuating means to substantially balance the weight of said stairway when it is extended out of said door opening, actuating means having an operative connection with said stairway and said door for moving them concurrently between door closed and stairway retracted position and door open and stairway extended position, and remotely controlled means normally conditioned to prevent actuation of said latching means to thereby prevent inadverent operation of the door from closed position.

2. In a vehicle, a body portion having a door opening therein, a door for closing said door opening, a foldable stairway movably secured to said body portion leading to said door opening, handrail means associated with said foldable stairway and movably mounted so as to be movable relative thereto to provide an actuating force effective in the folding and unfolding of the stairway, counterbalancing means associated with said stairway to substantially balance the weight thereof when it occupies its operative position, and actuating means operatively connected to said movable stairway and said door for actuating them concurrently between door closed and stairway inoperative position and door open and stairway operative position.

3. In an airplane, a fuselage having a door opening therein, a door pivotally mounted on said fuselage for closing said door opening, means connected to said door for moving it to open and closed position, a stairway, leading to said door opening, pivotally carried by said fuselage and movable relative thereto, means connected to said stairway for actuation thereof between an operative position wherein it extends downwardly and outwardly from said fuselage and an inoperative position wherein it is retracted through said door opening and disposed wholly within said fuselage, and manually movable means operatively interconnected with said door moving means and with the actuating means for said stairway for effecting concurrent operation thereof pivotally moving said door in one direction and the stairway in the opposite direction when the door is opened and the stairway actuated to extended position.

4. In an airplane, a fuselage having a door opening therein, a hingedly mounted door for closing said door opening, pivotally mounted means connected to said door for moving it to open and closed position, a foldable stairway leading to said door opening hingedly secured to said fuselage and movable relative thereto, pivotally mounted means connected to said stairway for actuation thereof between an operative position wherein it extends downwardly and outwardly from said door opening and an inoperative position wherein it is retracted through said door opening and disposed wholly within said fuselage, and manually movable means having an operative connection with said means for moving said door and the pivotally mounted actuating means for said stairway for effecting conjoint operation thereof pivotally moving said door in one direction and the stairway in the opposite direction when the door is opened and the stairway actuated to extended position.

5. In an airplane, a fuselage having a door opening therein, a door for closing said door opening, pivotally mounted means connected to said door for moving it to open and closed position, a stairway leading to said door opening secured to said fuselage and movable relative thereto, pivotally mounted means connected to said stairway for actuation thereof between an operative position wherein it extends outwardly from said door opening and an inoperative position wherein it is retracted through said door opening and disposed wholly within said fuselage, and manually movable means for moving said door moving means and the pivotally mounted actuating means for said stairway for effecting conjoint operation thereof, comprising a hand lever located within the fuselage, movable means connected to said door moving means for effecting actuation thereof, a second movable means connected to said pivotally mounted stairway actuating means for effecting rotative movement thereof, and means providing an operative connection between said hand lever and both of said movable means.

6. In an airplane, a fuselage having a door opening therein, a door for closing said door opening, means connected to said door for moving it to open and closed position, a stairway leading to said door opening secured to said fuselage and movable relative thereto, means connected to said stairway for actuation thereof between an operative position wherein it extends downwardly and outwardly from said fuselage and an inoperative position wherein it is retracted through said door opening and disposed wholly within said fuselage, and manually movable means operatively interconnecting said means for moving said door and the actuating means for said stairway for effecting concurrent operation thereof, comprising a hand lever, a pivotally mounted lever operatively connected to said hand lever, means interconnecting said pivotally mounted lever and said door moving means, and a second means interconnecting said pivotally mounted lever and said stairway actuating means.

7. In an airplane, a fuselage having a door opening therein, a door for closing said door opening, means connected to said door for moving it to open and closed position, a stairway leading to said door opening secured to said fuselage and movable relative thereto, means connected to said stairway for actuation thereof between an operative position wherein it extends downwardly and outwardly from said fuselage and an inoperative position wherein it is retracted through said door opening and disposed wholly within said fuselage, and manually movable means operatively interconnecting said means for moving said door and the actuating means for said stairway for effecting concurrent operation thereof, comprising a hand lever, a pivotally mounted lever operatively connected to said hand lever, means including spring means interconnecting said pivotally mounted lever and said door moving means, and a second means interconnecting said pivotally mounted lever and said stairway actuating means.

8. In an airplane, a fuselage having a door opening therein, a hingedly mounted door for closing said door opening, pivotally mounted means connected to said door for moving it to open and closed position, a stairway leading to said door opening hingedly secured to said fuselage and movable relative thereto, pivoted means connected to said stairway for actuation thereof between an operative position wherein it extends downwardly and outwardly from said fuselage and an inoperative position wherein it is retracted through said door opening and disposed wholly within said fuselage, and manually movable means operatively interconnecting said pivotally mounted door moving means and the pivoted actuating means for said stairway for effecting conjoint operation thereof, comprising a hand lever, a pivotally mounted lever connected to said hand lever for pivotal movement thereby, means operatively interconnecting said pivotally mounted lever and said pivoted door moving means, and a second means operatively interconnecting said pivotally mounted levers and said pivoted stairway actuating means.

9. In an airplane, a fuselage having a door opening therein, a door for closing said door opening, means connected to said door for moving it to open and closed position, latching means for securing said door when in closed position, a stairway leading to said door opening secured to said fuselage and movable relative thereto, means connected to said stairway for actuation thereof between an operative position wherein it extends downwardly and outwardly from said fuselage and an inoperative position wherein it is retracted through said door opening and disposed wholly within said fuselage, manually movable means operatively interconnecting said means for moving said door and the actuating means for said stairway for effecting concurrent operation thereof, comprising a hand lever, a pair of pivotally mounted levers actuable by said hand lever, a plurality of means operatively interconnecting one of said pivotally mounted levers with both said door moving means and with said stairway actuating means, and means interconnecting the other of said pivotally mounted levers and said latching means for actuation thereof to release said door to permit its movement to open position.

10. In an airplane, a fuselage having a door opening therein, a door for closing said door opening, means connected to said door for moving it to open and closed position, a stairway leading to said door opening secured to said fuselage and movable relative thereto, means connected to said stairway for actuation thereof between an operative position wherein it extends downwardly and outwardly from said fuselage and an inoperative position wherein it is retracted through said door opening and disposed wholly within said fuselage, manually movable means operatively interconnecting said means for moving said door and the actuating means for said stairway for effecting concurrent operation thereof, comprising a hand lever, a pair of pivotally mounted levers actuable by said hand lever, a plurality of means operatively interconnecting one of said pivotally mounted levers with both said door moving means and with said stairway actuating means, and means interconnecting the other of said pivotally mounted levers and said latching means for actuation thereof to release said door to permit its movement to open position, and remotely controlled means normally conditioned to prevent actuation of said latching means to thereby prevent inadvertent operation of the door from closed position.

11. In an airplane, a fuselage having a door opening therein, a pivotally mounted door for closing said door opening, pivoted means connected to said door for moving it to open and closed position, latching means for securing said door when in closed position, a stairway leading to said door opening hingedly secured to said fuselage and movable relative thereto, pivoted means connected to said stairway for actuation thereof between an operative position wherein it extends downwardly and outwardly from said fuselage and an inoperative position wherein it is retracted through said door opening and disposed wholly within said fuselage, manually movable means operatively interconnecting said pivoted door moving means and the pivoted actuating means for said stairway for effecting concurrent operation thereof, comprising a hand lever, a pair of pivotally mounted levers actuable by said hand lever, a plurality of means operatively interconnecting one of said pivotally mounted levers with both said pivoted door moving means and said pivoted stairway actuating means, and means interconnecting the other of said pivotally mounted levers and said latching means for actuation thereof to release said door to permit its movement to open position.

12. In an airplane, a fuselage having a door opening therein, a door for closing said door opening, means connected to said door for moving it to open and closed position, a foldable stairway leading to said door opening secured to said fuselage and movable relative thereto, handrail means associated with said foldable stairway and so arranged and mounted as to be movable relative thereto to provide an actuating force effective in the folding and unfolding of the stairway, means connected to said stairway for actuation thereof between an operative position wherein it extends downwardly and outwardly from said fuselage and an inoperative position wherein it is retracted through said door opening and disposed wholly within said fuselage, counterbalancing means operative on said stairway actuating means to substantially balance the weight of said stairway when it is extended out of said door opening, and manually movable means operatively interconnecting said means for moving said door and the actuating means for said stairway for effecting concurrent operation thereof, comprising a hand lever, a pivotally mounted lever operatively connected to said hand lever, means interconnecting said pivotally mounted lever and said door moving means, and a second means interconnecting said pivotally mounted lever and said stairway actuating means.

13. In an airplane fuselage having a door opening therein, a door for closing said opening, a foldable stairway mounted on said fuselage adapted to be extended to operative position and retracted to inoperative position wherein it is folded and disposed within said fuselage, handrail means positioned adjacent said foldable stairway and mounted so as to be movable relative thereto, actuating means operatively interconnected with said door and said foldable stairway for moving said door to open and closed position and said stairway between its operative and inoperative positions, and means connecting said actuating means to said handrail means for effecting movement of the handrail means relative to said stairway to move the sections of the stairway toward and away from one another during the folding and unfolding of said stairway.

14. In an airplane fuselage having a door opening therein, a door for closing said opening, a foldable stairway mounted on said fuselage adapted to be extended to operative position and retracted to inoperative position wherein it is folded and disposed within said fuselage, actuating means having operative interconnection with said door and said foldable stairway for effecting conjoint operation thereof between their operative and inoperative positions, said actuating means including an actuating lever connected to said stairway, handrail means positioned adjacent said foldable stairway and mounted so as to be movable relative thereto and having a connection with said actuating lever whereby said actuating lever may move said handrail means and the handrail means may move the sections of the foldable stairway toward and away from one another during the folding and unfolding of said stairway.

15. In an airplane fuselage having a door opening therein, a door for closing said opening, a foldable stairway hingedly mounted on said fuselage adapted to be extended to operative position and retracted to inoperative position wherein it is folded and disposed within said fuselage, handrail means positioned adjacent said foldable stairway and mounted so as to be movable relative thereto to provide an actuating force effective in the folding and unfolding of the stairway, and actuating means for moving said door to open and closed position and for moving said foldable stairway between its operative and inoperative positions, said actuating means including a pivotally mounted actuating lever for said stairway and means operatively interconnecting said actuating lever and said handrail means whereby said actuating lever when pivotally moved moves said handrail means.

16. In a vehicle, a body portion having a door opening therein, a door pivotally mounted on said body portion for closing said door opening, a folding stairway pivotally secured to said body portion leading to said door opening whereby access is had to the interior of said body portion, actuating means for retracting and extending said stairway in and out of said door opening, counterbalancing means including spring means having a connection with said door and being operative on said stairway actuating means whereby the weight of the door acts in concert with the counterbalancing means to substantially balance the weight of said stairway when it is extended out of said door opening, and actuating means having an operative connection with said stairway and said door for moving them concurrently between door closed and stairway retracted position and door open and stairway extended position.

17. In a vehicle, a body portion having a door opening therein, a door pivotally mounted on said body portion for closing said door opening, a folding stairway pivotally secured to said body portion leading to said door opening whereby access is had to the interior of said body portion, means including spring means for moving said door between open and closed position, means for actuating said stairway for movement through said door opening into and out of said body portion, means operatively interconnecting said spring means and said stairway actuating means whereby the weight of the door acts in concert with the bias of said spring means to substantially counterbalance the weight of said stairway when it is disposed exteriorly of said body portion in operative position, and actuating means having an operative connection with said stairway and said door for moving them concurrently between door closed and stairway inoperative position and door open and stairway operative position.

FRANK W. FINK.
LA VERNE E. MORGAN.

REFERENCES CITED

The following references are of record in the file of this patent:

UNITED STATES PATENTS

| Number | Name | Date |
|---|---|---|
| 937,710 | Mowrey | Oct. 19, 1909 |
| 1,636,281 | Bessler | July 19, 1927 |
| 1,767,148 | Marschke | June 24, 1930 |
| 1,994,883 | Chambers | Mar. 19, 1935 |
| 2,037,805 | Lindstedt | Apr. 21, 1936 |
| 2,323,279 | Van Zelm | June 29, 1943 |